Dec. 7, 1971   N. J. BOSE   3,625,083
TRACK BALL ENCODER

Filed Oct. 17, 1969   3 Sheets-Sheet 1

INVENTOR.
NORMAN J. BOSE
BY
ATTORNEYS

Dec. 7, 1971  N. J. BOSE  3,625,083
TRACK BALL ENCODER
Filed Oct. 17, 1969  3 Sheets-Sheet 2

INVENTOR.
NORMAN J. BOSE
BY
ATTORNEYS

INVENTOR.
NORMAN J. BOSE

United States Patent Office 3,625,083
Patented Dec. 7, 1971

3,625,083
TRACK BALL ENCODER
Norman J. Bose, North Hollywood, Calif., assignor to The Singer Company
Filed Oct. 17, 1969, Ser. No. 867,209
Int. Cl. G05g 9/00
U.S. Cl. 74—471 XY                4 Claims

ABSTRACT OF THE DISCLOSURE

A two axis digital encoder having as an input a manually controlled bearing-supported spherical ball which, when rotated, actuates two rotatable encoders frictionally coupled to the ball surface and oriented 90 degrees from each other so that the output of one encoder represents an X function, and the other a Y function.

BACKGROUND OF THE INVENTION

Track ball encoders may be used to control display devices such as the position of a pip on a cathode ray tube display, and are also useful in numerical controls for machine tools or other equipment requiring remote electronic positioning control for two-dimensional functions.

The encoder discs of track ball encoders are usually provided with incremental digital codes so that, when rotated by the track ball, a disc will produce evenly spaced make-or-break electrical pulses which are counted by suitable circuitry to indicate a certain manually entered input. If desired, the encoder discs may be provided with suitable binary codes so that they may produce absolute binary outputs representing precise positions.

SUMMARY OF THE INVENTION

Briefly described, the present track ball encoder comprises a spherical ball of any convenient size seated in a bearing within a housing. The top portion of the ball extends above the housing so that it can be manually rotated in any desired direction. A pair of digital encoders are disposed 90 degrees to each other within the housing and are frictionally coupled to the ball at its equator so that rotation of the ball will result in rotation in either one or both of the encoders by amounts that depend upon the angle that the track ball's rotational axis makes with the shaft axis of each particular encoder. In the invention, the bearing that supports the spherical track ball is not the conventional type of caged bearing but is comprised of a relatively large quantity of small bearing balls in a spherically concave cup having the identical spherical center as that of the spherical track ball. The peripheral portion of the cup is bevelled downward from the spherical radius, i.e., has a larger radius than the spherical radius of the concave cup, to form a relief ring into which the bearing balls roll out of contact with the track ball and around which they circulate until they again drop into the spherical cup portion to again support the track ball.

DESCRIPTION OF DRAWINGS

In the drawings which illustrate a preferred embodiment of the invention.

DETAILED DESCRIPTION

Figure 1:
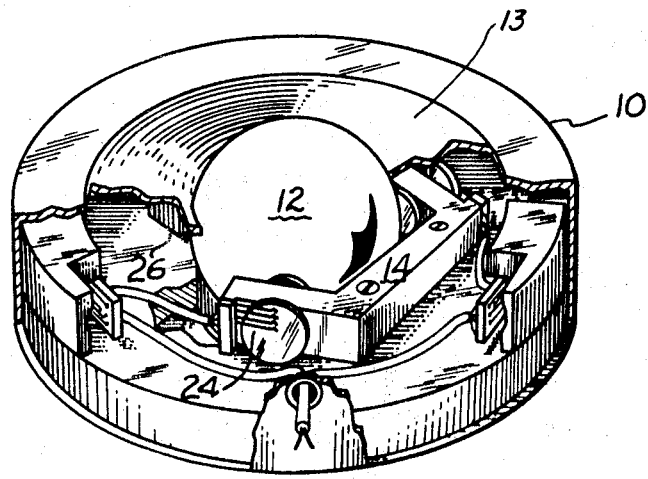
FIG. 1 is a perspective drawing generally illustrating the housing containing the track ball and its frictionally engaged encoders.

The track ball encoder illustrated in FIG. 1 comprises a flat circular housing 10 containing a centrally located spherical input ball 12 which may be made of any material which can be provided with a smooth surface. Ball 12 is rotatably seated within housing 10 with its upper surface extending above the housing so that the ball 12 may be manually rotated in any desired direction with the fingers or palm of the operator. Housing 10 is provided with a removable cover plate 13 which has a circular hole of a diameter smaller than that of ball 12 and which loosely engages ball 12 above its equator to prevent ball 12 from dropping or being removed from housing 10.

Figure 2:
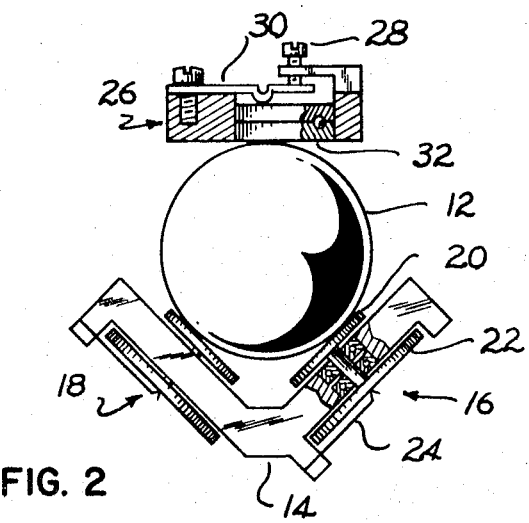
FIG. 2 is a plan view showing the track ball, the two encoders, and a spring-loaded thrust bearing which is provided to assure tight contact between the track ball and encoders.

Positioned adjacent ball 12 and affixed to housing 10 is encoder frame 14 which supports shaft rotation to digital encoders 16 and 18, as better illustrated in FIG. 2. Encoders 16 and 18 are mounted on frame 14 at right angles to each other and each encoder comprises a friction disc 20, the surface of which frictionally engages the equator of ball 12 at a predetermined distance from the center of the disc, and an encoder disc 22 which rotates in accordance with the rotation of friction disc 20 and which is provided with a suitable binary code that may be sensed by brushes 24 which are positioned to wipe the surface of encoder disc 22 to sense its particular binary code. In order to assure a suitable friction contact between the input ball 12 and the surface of friction disc 20 of the encoders, a pressure pad 26 is mounted to frame 10 in such a position to apply a spring force against the equator of ball 12 to force that ball toward the encoders. Pressure pad 26 is comprised of an adjustment screw 28 which is adjusted against spring 30 which, in turn, bears against thrust bearing 32 that contacts the equator of ball 12.

Figure 3:
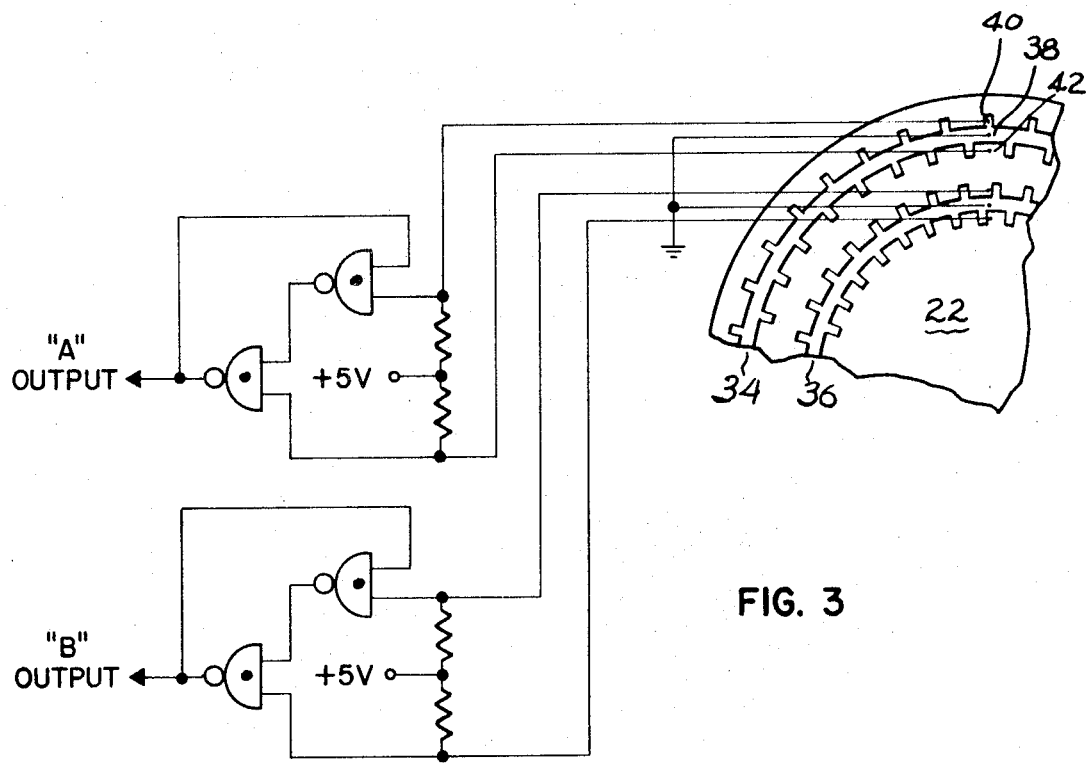
FIG. 3 is a schematic drawing illustrating a typical tracks ball encoder disc and associated circuitry.

An example of the binary code that may be used with the encoder disc 22 is illustrated in FIG. 3. In this example, disc 22 is provided with an electrically nonconductive surface except for two concentric conductive tracks 34 and 36 provided with an incremental code in which output pulses are counted to provide an indication of rotation of disc 22. As shown in FIG. 3, each track 34 or 36 is provided with three brushes, such as brushes 24 as shown in FIG. 2. In track 34, brush 38 connects the continuous portion of track 34 to ground while brushes 40 and 42 sense the grounded segments of track 34 as disc 22 rotates. The sensing brushes 40 and 42 are connected to the input terminals of a conventional RS flip-flop circuit which, as illustrated in FIG. 3, may be comprised of a pair of suitably connected conventional NAND gates. In the circuit shown, the flip-flop produces a true or binary 1 output when brush 42 contacts a grounded segment on track 34, and the flip-flop is reset to produce a false or binary 0 output when brush 40 senses a grounded segment. It should be understood that the circuitry and the particular code surface of encoder disc 22 forms no part of this invention and any desirable code may be used such as one that indicates the actual rotational position of disc 22.

Figure 4:
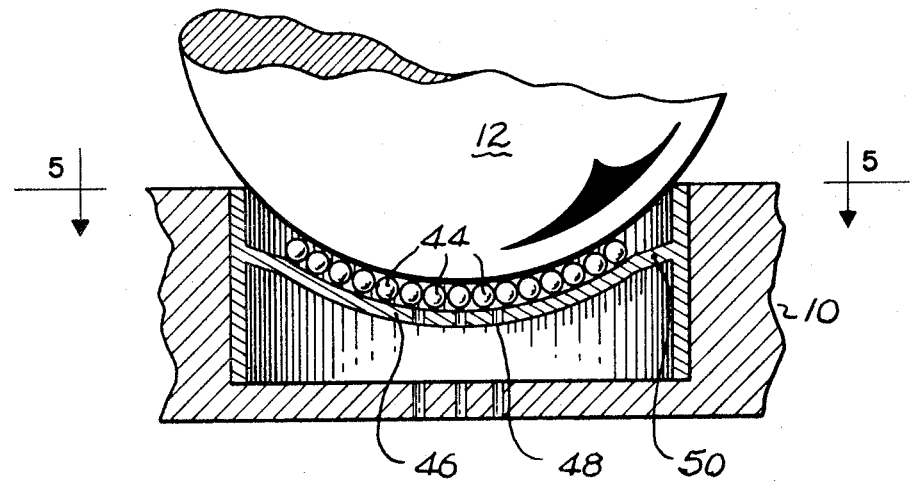
FIG. 4 is a fragmentary elevation view showing in cross section the details of the bearing in which the track ball is seated.

To assure minimum rotational friction and minimum wear on the surface of the track ball 12, the ball is seated in a plurality of small rotatable ball bearings 44, as shown in FIG. 4. All of the bearings 44 are identical in size and may be made of any suitable bearing material, such as steel or nylon, and are randomly placed in a single layer in a spherically concave cup 46. The spherical center of cup 46 is identical with the center of ball 12 so that the surface of ball 12 is evenly spaced from the surface of the spherically concave portion of cup 46 to assure contact with the bearings 44. It is advisable to provide cup 44 with several small drainage holes 48 in its center or bottommost area to prevent moisture or dust from accumulating on the concave surface of cup 46.

Figure 6:
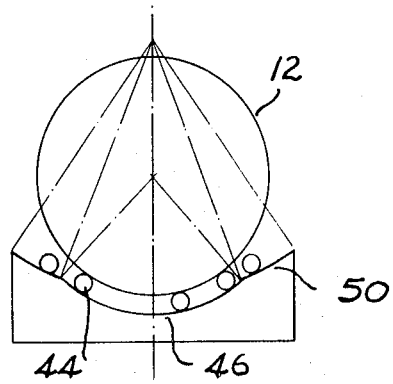
FIG. 6 is a simplified elevation view illustrating how the relief ring may be formed in the bearing seat of FIGS. 4 or 5.

The peripheral portion of cup 46 is flared from the normal curvature of the cup to provide a return path for the rotating bearing balls 44 as they are moved by the rotation of track ball 12. As shown in FIG. 4, this peripheral ring 50 may be a flat section, or peripheral ring 50 may be spherically concave with a radius larger than that of cup 46, as better shown in the simplified diagram of FIG. 6.

Figure 5:
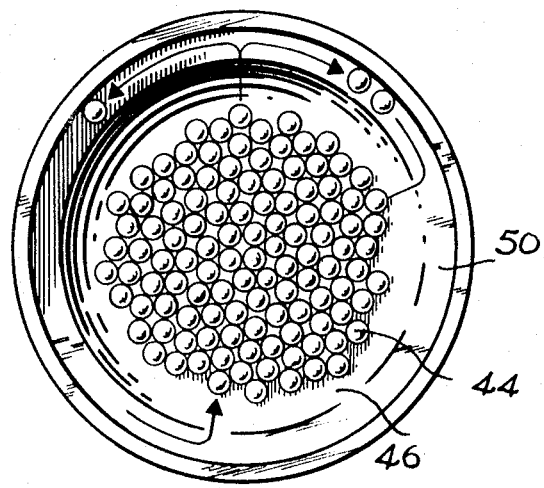
FIG. 5 is a plan view taken along the lines 5—5 of FIG. 4.

A plan view of the cup 46 and bearings 44 is shown in FIG. 5. As the track ball 12 is manually rotated by the operator, the bearings 44 will similarly roll to provide low friction to the movement of the ball 12. The bearings 44 will, however, tend to roll up the side of cup 46 until they enter the peripheral ring 50 where they drop out of contact with the ball 12. As shown by the arrows in the peripheral ring 50 in FIG. 5, the balls are forced from the cup 46 into the peripheral ring 50 and around ring 50 until they drop back into the cup 46 and into contact with the cup and the track ball 12. Regardless of the direction of rotation of track ball 12, the bearings 44 will freely roll from the cup 46 into the ring 50 and will return to the cup wherever there is adequate space for them. The track ball 12 is thus freely supported for rotation in any direction with a minimum of friction.

I claim:
1. A track ball encoder for providing electrical X and Y axis signals corresponding to the rotation of the input ball, said encoder including:
   a housing;
   bearing means within said housing;
   a spherical input ball rotatably engaging said bearing means, a portion of said ball being partially exposed from said housing for access for manual rotation of said ball by an operator;
   a pair of shaft rotation to digital encoders mounted within said housing; and
   means for coupling said pair for rotation by said input ball, said means comprising:
   a rotatable disc coupled to each rotatable shaft of said pair of encoders, the flat surface of said discs positioned to frictionally engage points on the equator of said input ball at right angles to each other; and
   a pressure pad positioned on the equator of said ball at a point substantially opposite the point midway between the contact points of said discs, said pressure pad having an adjustable spring for controlling the force of said input ball against the surfaces of said discs.

2. The track ball encoder claimed in claim 1 wherein said housing includes a cover plate having therein an aperture adapted to loosely engage said input ball to prevent removal of said ball.

3. The track ball encoder claimed in claim 1 and wherein said bearing means comprises a spherically concave cup having a peripheral relief ring, said cup containing a plurality of bearing balls randomly positioned for rolling contact with said input ball.

4. The track ball encoder claimed in claim 3 wherein said peripheral relief ring is sloped with respect to said concave cup for removing the bearing balls from bearing engagement with said input ball and thus permitting said bearing balls to relocate themselves in unoccupied areas of bearing engagement between said input ball and the spherically concave portion of said bearing means.

References Cited
UNITED STATES PATENTS

| | | | |
|---|---|---|---|
| 2,869,429 | 1/1959 | Wetzel | 74—471 |
| 2,873,441 | 2/1959 | Miller | 340—204 |
| 2,929,258 | 3/1960 | Mackway | 74—471 |
| 2,944,238 | 7/1960 | Barnett et al. | 338—131 |
| 2,978,922 | 4/1961 | Peterson | 74—471 |
| 3,013,441 | 12/1961 | Alexander | 74—471 |
| 3,269,190 | 8/1966 | Laman | 74—471 |
| 3,304,434 | 2/1967 | Koster | 340—271 |
| 3,395,589 | 8/1968 | Gersten | 74—471 |

JOHN W. CALDWELL, Primary Examiner

R. J. MOONEY, Assistant Examiner